United States Patent
Suzuki

(10) Patent No.: US 6,726,378 B2
(45) Date of Patent: Apr. 27, 2004

(54) CONNECTING METHOD OF DIFFERENT KIND OPTICAL FIBERS

(75) Inventor: Tetsuo Suzuki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/160,560

(22) Filed: May 30, 2002

(65) Prior Publication Data

US 2003/0021553 A1 Jan. 30, 2003

Related U.S. Application Data

(63) Continuation of application No. PCT/JP02/02695, filed on Mar. 20, 2002.

(30) Foreign Application Priority Data

Mar. 29, 2001 (JP) ........................................ 2001-096533
Jun. 12, 2001 (JP) ........................................ 2001-177281

(51) Int. Cl.⁷ .............................................. G02B 6/255
(52) U.S. Cl. ........................................... 385/96; 385/99
(58) Field of Search ..................................... 385/95–99

(56) References Cited

U.S. PATENT DOCUMENTS 6,550,985 B2 * 4/2003 Nakamura et al. ............ 385/96

FOREIGN PATENT DOCUMENTS

| JP | 58-042015 | | 3/1983 | | |
|----|-----------|---|--------|---|---|
| JP | 56-211723 | | 12/1983 | | |
| JP | 58-211723 | * | 12/1983 | ............ | G02B/7/26 |
| JP | 05-027135 | | 2/1993 | | |
| JP | 05-027135 | * | 5/1993 | ........... | G02B/6/255 |
| JP | 07-084142 | * | 3/1995 | ........... | G02B/6/255 |

* cited by examiner

Primary Examiner—Hemang Sanghavi
Assistant Examiner—Omar Rojas
(74) Attorney, Agent, or Firm—Knobbe Martens Olson & Bear LLP

(57) ABSTRACT

The connecting method of different kind optical fibers of the present invention is a connecting method able to improve the strength of connecting portions of the different kind optical fibers of different mode field diameters. In this connecting method, connecting ends of the different kind optical fibers removing their coating therefrom are mutually butted and fusion-spliced by gripping the coating in a step (S4). Next, the mode field diameters of different kind optical fiber connecting portions are conformed to each other by the heat treatment of a step (S5). This heat treatment is taken within a low dust space having a clean degree of 1000 or less in class. Thus, the heat treatment is taken under an environment in which foreign matters floated around the connecting portions of the different kind optical fibers are very small. Therefore, it is possible to restrain a crack from being caused by burning the foreign matters into the connecting portions. Accordingly, strength deterioration of the connecting portions of the different kind optical fibers caused by the crack can be prevented.

12 Claims, 9 Drawing Sheets

CONNECTING METHOD OF DIFFERENT KIND OPTICAL FIBERS

This application is a continuation 35 U.S.C. Sections 120 and 365 to International Application No. PCT/JP02/02695, filed on Mar. 20, 2002, which published in the Japanese language as International Publication No. WO 02/079830A1 on Oct. 10, 2002. The disclosure of the international application is hereby incorporated by reference in its entirety.

TECHNICAL FIELD

The present invention relates to a connecting method of different kind optical fibers for connecting the different kind optical fibers having different mode field diameters (MFDs) to each other.

BACKGROUND ART

In recent years, an increase in the capacity of an optical communication system is required. A dispersion management line for performing high bit-rate communication in a band of e.g., 1550 nm in wavelength is vigorously considered to satisfy this requirement. For example, this dispersion management line is formed by connecting a single mode optical fiber such as a 1300 nm zero dispersion optical fiber, and a dispersion-compensating optical fiber for compensating dispersion and a dispersion slope of this single mode optical fiber.

For example, the above dispersion-compensating optical fiber is formed by a DCF (Dispersion Compensating Fiber), a DSCF (Dispersion Slope Compensating Fiber), an RDF (Reverse Dispersion Fiber), etc. When such a dispersion management line is used in an optical submarine cable, etc., it is desirable to connect different kind optical fibers with low transmission loss and high strength.

For example, the 1300 nm zero dispersion optical fiber is a single mode optical fiber, and the MFD of the 1300 nm zero dispersion optical fiber at a wavelength of 1550 nm ranges from 9 to 11 μm. Further, the MFD of an MFD enlarged type single mode optical fiber at the wavelength of 1550 nm is 11 μm or more.

In contrast to this, the MFD of the dispersion-compensating optical fiber having negative high dispersion characteristics at the wavelength of 1550 nm is about 5 μm. Accordingly, the MFD of the dispersion-compensating optical fiber is small in comparison with the single mode optical fiber. The dispersion-compensating optical fiber has a high relative refractive index difference A of about 3% and a small core diameter of 2 to 3 μm.

When the above different kind optical fibers of different MFDs are connected to each other, splice loss is increased by the difference in MFD. For example, the splice loss is about 1.94 dB when the single mode optical fiber having 10 μm in MFD and the dispersion-compensating optical fiber having 5 μm in MFD are connected to each other by conforming their optical axes.

For example, processing using a TEC method (Thermally Diffused Expanded Core) is performed to restrain this increase in splice loss after connecting end faces of the different kind optical fibers are connected to each other. For example, the processing using the TEC method is performed by heating connecting portions of the single mode optical fiber and the dispersion-compensating optical fiber. The processing using the TEC method is processing for enlarging the MFD of the dispersion-compensating optical fiber by diffusing Ge (dopant) within a core and conforming this MFD to the MFD of the single mode optical fiber by heating the above connecting portions. The splice loss is greatly reduced by performing this processing.

FIG. 9 is a flow chart showing one example of a conventional connecting process of the different kind optical fibers. For example, the different kind optical fibers such as the single mode optical fiber and the dispersion-compensating optical fiber are connected to each other as follows in accordance with the flow shown in FIG. 9. A step 101 of FIG. 9 is a coating removing process for removing the coating layers of respective connecting end portions of the different kind optical fibers and exposing the connecting end portions of the optical fibers. A step 102 is a fiber cleaning process for cleaning an exposed portion of each of these optical fibers. A step 103 is a process for forming a protecting layer on the surface of the exposed portion of each cleaned optical fiber.

A step 104 is a process for cutting a tip portion of each optical fiber. A step 105 is a process for fusion-splicing the cut different kind optical fibers by butting their connecting end faces. The above cutting processing of the optical fiber and the fusion splice processing of the optical fiber are performed by arranging the exposed portion (tip portion) of the optical fiber in e.g., a V-groove formed in a fixing member.

The exposed portion of the optical fiber arranged in the V-groove is positioned and fixed to the fixing member by pressing this optical fiber from its upper side by a clamp member. In such a gripping fixing state (glass gripping state), the cutting processing and the fusion splice processing of the above optical fiber are performed. The protecting layer formed on the surface of the exposed portion of the optical fiber in the above step 103 is arranged to reduce a bad influence on the optical fiber due to the gripping fixation.

A step 106 is a process for taking heat treatment for conforming the MFDs of the connecting end portions of the optical fibers connected to each other.

A small crack is caused in a surface portion of the connecting portion of the different kind optical fiber by heating of the fusion splice processing and the heat treatment. When there is such a crack, strength of the connecting portion of the different kind optical fiber is reduced. Therefore, an operation for preventing this strength deterioration is performed. This operation is performed by the etching process of a step 107, and is an operation for removing the crack by etching the surface portion of the connecting portion of the optical fiber after the above heat treatment.

A step 108 is a recoating process for coating the connecting portion of the different kind optical fiber by forming a coating layer on the surface of the exposed portion of the optical fiber. A step 109 is a process for inspecting whether or not the different kind optical fiber is connected in accordance with a standard by a proof test.

However, in a conventional method, the connecting portions of the single mode optical fiber and the dispersion-compensating optical fiber were about 1 GPa in average breaking strength, and no satisfactory strength was obtained. Further, this strength was greatly dispersed.

Therefore, the present inventors examined the cause of the strength deterioration of the connecting portion of the different kind optical fiber. As a result, it has been found that one of causes of the strength deterioration of the connecting portion of the different kind optical fiber resides in an environment in the heat treatment for conforming the mode field diameters of the respective optical fibers in the connecting portions.

Namely, when the heat treatment is taken, foreign matters floated around the connecting portion of the different kind optical fiber and foreign matters attached to the surface of the connecting portion are burned onto the surface of the connecting portion of the different kind optical fiber by the heat treatment. Therefore, there is a case in which a small crack is caused in the connecting portion of the different kind optical fiber by these burned foreign matters. Thus, it has been found that the strength of the connecting portion of the different kind optical fiber is deteriorated by this crack.

In the conventional method, processing for removing the crack from a surface portion of the connecting portion of the different kind optical fiber by etching this surface portion is performed after the heat treatment. However, it is confirmed that no crack caused by the burned foreign matters due to the heat treatment can be almost removed by this etching processing.

Further, the present inventors have also found the following matters by examining the cause of the strength deterioration of the connecting portion of the different kind optical fiber. The heat treatment of the connecting portion of the different kind optical fiber was conventionally taken after the protecting layer was formed on the surface of an exposed portion of the optical fiber. Therefore, the protecting layer formed in the connecting portion of the different kind optical fiber was burned and a large amount of foreign matters was generated at a heat treatment time of the connecting portion of the different kind optical fiber. These foreign matters were burned onto the optical fiber surface and many small cracks were caused.

As mentioned above, no cracks caused by the burned foreign matters due to the heat treatment can be almost removed by the etching processing after the heat treatment. Therefore, the strength of the connecting portion of the different kind optical fiber is deteriorated by these unremoved cracks.

The present invention in its one aspect provides a connecting method of different kind optical fibers able to obtain a connecting state of the different kind optical fibers with low splice loss and satisfactory strength.

DISCLOSURE OF THE INVENTION

The present invention provides a connecting method of different kind optical fibers having the following construction. Namely, the connecting portions of the different kind optical fibers of the present invention is a connecting method of different kind optical fibers for performing plural processings including processing for mutually fusion-splicing connecting end faces of the different kind optical fibers of different mode field diameters, and heat treatment for heating their connecting portions and conforming the mode field diameters of the respective optical fibers in these connecting portions; wherein at least said heat treatment among the plural processings in a connecting process of the different kind optical fibers is taken within a low dust space having a clean degree of 1000 or less in class.

In a preferable mode example of the present invention, processing for cleaning at least a portion of a heat treatment object is performed just before the heat treatment is taken.

In a more preferable mode example of the present invention, a protecting layer is formed on the surface of each of the optical fibers after the heat treatment by avoiding a heat-treated area, and an optical fiber surface portion of an etching processing area including said heat-treated area is then etched.

Further, in a more preferable mode example of the present invention, the optical fibers connected to each other are respectively coated with coating layers, and fusion splice is performed after the coating layers of connecting end portions of these respective optical fibers are removed, and the length interval of the etching processing area is a length interval equal to or greater than a length interval for taking the heat treatment and smaller than an interval for removing the coating layers therefrom.

Further, another mode example of the present invention resides in a connecting method of different kind optical fibers for connecting the different kind optical fibers of different mode field diameters having fiber outer circumferences coated with coating layers, wherein the optical fibers are exposed by removing the coating layers of connecting end portions of the optical fibers, and connecting end faces of the different kind optical fibers are then mutually butted and fusion-spliced, and heat treatment for heating these connecting portions and conforming the mode field diameters of the respective optical fibers in these connecting portions is then taken, and at least a root outer circumferential face of the exposed optical fiber is then coated with a protecting layer together with a removing end face portion of the coating layer, and a heat-treated optical fiber surface portion is then etched.

Further, in one mode example of the present invention in another aspect of the present invention, processing for cleaning at least a portion of a heat treatment object is performed just before the heat treatment is taken.

Further, in one mode example of the present invention in another aspect of the present invention, the above etching processing interval includes a heat treatment interval, and a non-etching processing interval is formed between the etching processing interval and coating layer removing end faces on both sides of this etching processing interval.

BEST MODE FOR CARRYING OUT THE INVENTION

Figure 1:
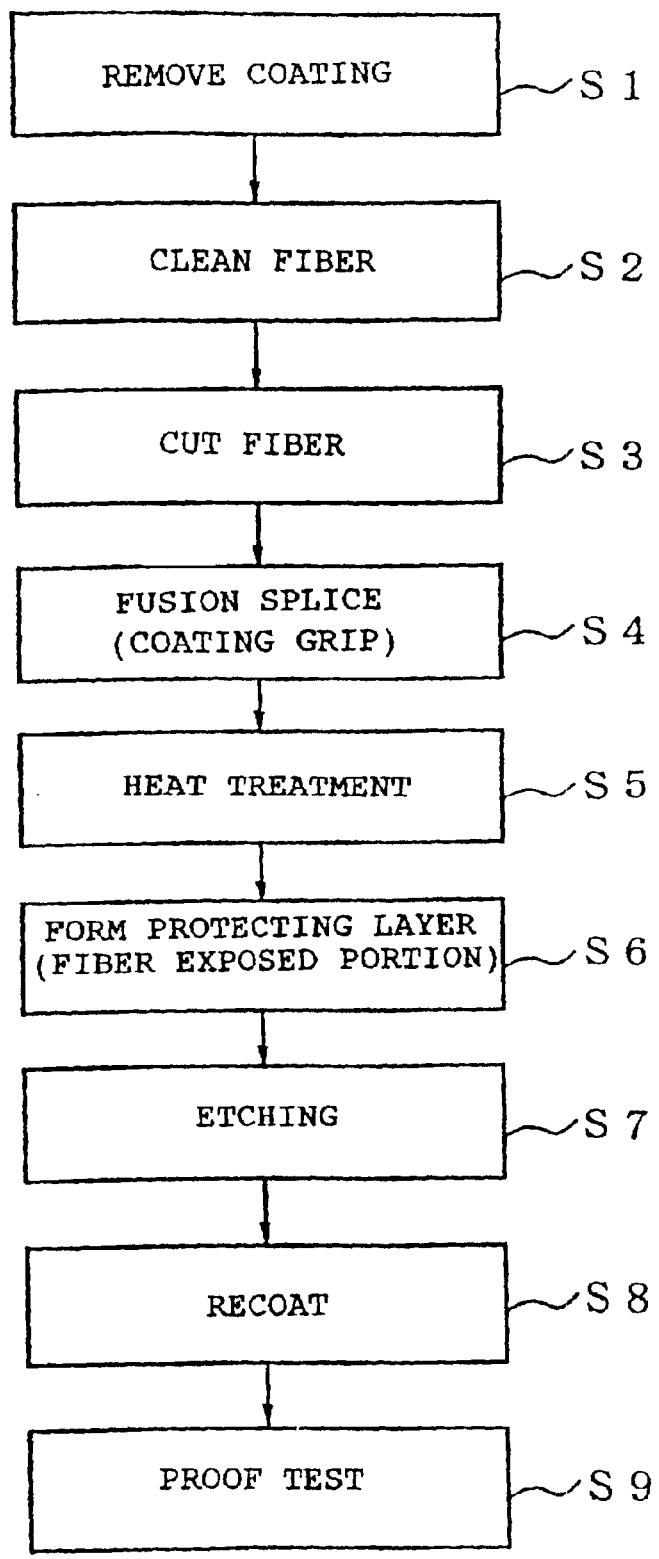
FIG. 1 is a flow chart showing a connecting process of different kind optical fibers in a first embodiment of the present invention.

The present invention will be explained in accordance with the accompanying drawings to describe the present invention in more detail. In the explanation of each embodiment, the same term portions as the conventional example are designated by the same reference numerals, and their overlapping explanations are omitted or simplified.

As mentioned above, it has been found that one of causes of the strength deterioration of a connecting portion of a different kind optical fiber resides in a working environment in heat treatment. Therefore, the present inventors have considered that the heat treatment is taken within a low dust space having a high clean degree, and have calculated the relation of the clean degree of the working space and the strength of the connecting portion of the different kind optical fiber by an experiment. It has been found on the basis of this experimental result that it is sufficient to set the clean degree of the working space of the heat treatment to 1000 or less in class to connect the different kind optical fibers with satisfactory strength.

In consideration of these contents, the present inventors have invented a first embodiment of the connecting method of the different kind optical fibers described next.

The first embodiment will be explained on the basis of the flow chart of FIG. 1.

Figure 3A:
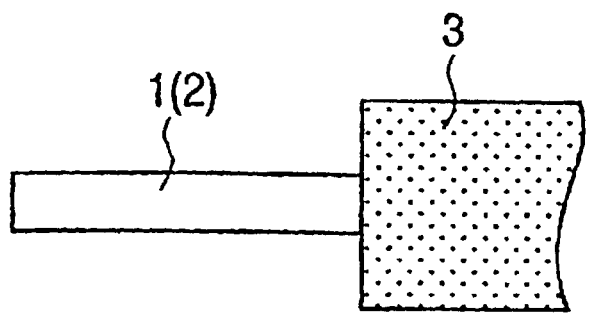
FIG. 3A is a model diagram for explaining a coating removing process in the connecting process of the different kind optical fibers.

A step S1 of FIG. 1 is a coating removing process for removing a coating layer 3 of a connecting end portion of each of different kind optical fibers 1, 2 having different mode field diameters (MFDs) as a single mode optical fiber and a dispersion-compensating optical fiber. FIG. 3A shows each of the different kind optical fibers 1, 2 from which the coating layer 3 of the connecting end portion is removed.

Figure 3B:
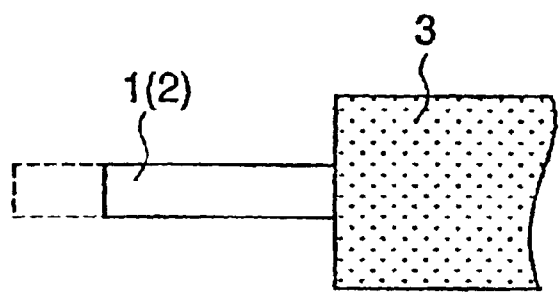
FIG. 3B is a model diagram for explaining a fiber cutting process in the connecting process of the different kind optical fibers.
Figure 3C:
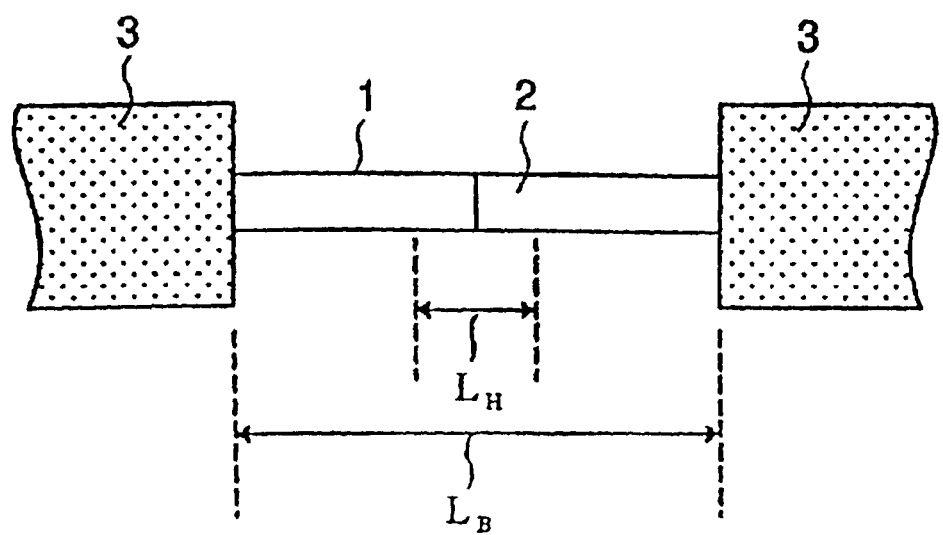
FIG. 3C is a model diagram for explaining a fusion splice process in the connecting process of the different kind optical fibers.

A step S2 of FIG. 1 is a fiber cleaning process for cleaning connecting end portions of the respective optical fibers 1, 2 exposed by the above coating removing process. A step S3 is a fiber cutting process for cutting tip portions of the respective optical fibers 1, 2 by set lengths as shown in FIG. 3B after the above fiber cleaning process. A step S4 of FIG. 1 is a fusion splice process for fusion-splicing cut tip faces (connecting end faces) of the respective optical fibers 1, 2 by butting these cut tip faces (connecting end faces) after the above fiber cutting process. FIG. 3C shows fusion-spliced connecting portions of the optical fibers 1, 2.

The cutting processing and the fusion splice processing of the optical fibers were conventionally performed in a state in which the respective connecting end portions of the optical fibers 1, 2 exposed by removing the coating layer 3 were gripped and fixed. Therefore, the cutting processing and the fusion splice were performed after a protecting layer was formed in each of the exposed portions of the optical fiber 1, 2 so as to restrain the optical fibers 1, 2 from being badly influenced by this gripping fixation.

However, as mentioned above, when the heat treatment is taken in a forming state of the protecting layer, this protecting layer is burned and a large amount of foreign matters is generated during the heat treatment. The foreign matters are floated around the connecting portions of the different kind optical fibers 1, 2 and the above-mentioned burning-in of the foreign matters is caused and is one of causes of the crack generation.

Therefore, in this first embodiment, the cutting process of the optical fibers 1, 2 of the step S3 and the fusion splice process of the step S4 are constructed such that the respective optical fibers 1, 2 are positioned and fixed by respectively gripping portions coated with the coating layers 3. In this construction, it is not necessary to form the protecting layer as in the conventional case before the heat treatment so that no foreign matters are generated by the protecting layer during the heat treatment.

A step S5 of FIG. 1 is a heat treatment process for taking heat treatment for conforming the MFDs of the different kind optical fibers 1, 2 after the above fusion splice process. As mentioned above, this heat treatment is taken within a low dust space having a clean degree of 1000 or less in class.

This heat treatment is also taken in a state in which an end portion of one of the different kind optical fibers 1, 2 on its one side is connected to a light source and an end portion on the other end side is connected to a power meter, etc. This heat treatment is then taken while light is incident to the end portion on one side from the above light source, and light emitted from the end portion on the other side is detected by the power meter and the splice loss of connecting portions of the different kind optical fibers 1, 2 is monitored.

The above heat treatment is terminated when the splice loss monitored by the power meter is set to a predetermined set value. For example, the set value of this splice loss is 0.1 dB or less at a wavelength of 1550 nm.

A step S6 is a protecting layer forming process for forming the protecting layer on the surface of each of exposed portions of the different kind optical fibers 1, 2 by avoiding a predetermined etching processing area after the above heat treatment process.

In the first embodiment, the length interval $L_E$ of the etching processing area is set to a length interval ($L_H \leq L_E < L_B$) equal to or greater than the length interval $L_H$ of an area for taking the above heat treatment and smaller than an interval (bare fiber interval $L_B$) removing the coating layer 3 therefrom as shown in FIG. 3C. For example, the protecting layer 8 is formed by using a material such as varnish (urethane system, ester system, amide system, nylon system, etc.) and a resin system adhesive.

A step S7 of FIG. 1 is an etching process for etching an optical fiber surface portion of the above etching processing area after the above protecting layer forming process. Cracks formed in surface portions of the connecting portions of the different kind optical fibers 1, 2 are removed by this etching processing.

A step S8 is a recoating process for again coating the exposed portions of the optical fibers 1, 2 after the above etching process. A step S9 is a process for making a proof test of the connecting portions of these different kind optical fibers 1, 2 after this recoating process.

In the connecting method of the optical fibers of the first embodiment, the heating treatment of the connecting portions of the optical fibers 1, 2 is taken within a low dust space having a clean degree of 1000 or less in class, i.e., under an environment in which the amount of floated foreign matters is very small. In the connecting method of the different kind optical fibers having the construction for taking the heat treatment of the connecting portions of the optical fibers 1, 2 within the low dust space having the clean degree of 1000 or less in class, it is possible to greatly reduce the amount of foreign matters burned onto the surfaces of the connecting portions of the different kind optical fibers by the heat treatment. Thus, the generation of cracks caused by the burned foreign matters can be prevented.

Moreover, since the first embodiment is constructed such that no protecting layer is formed in the exposed portions of the optical fibers 1, 2 before the heat treatment, the generation of the foreign matters caused by the protecting layer can be avoided during the heat treatment.

Thus, in the first embodiment, it is possible to prevent the generation of the cracks caused by the foreign matters burned onto the surfaces of the connecting portions of the different kind optical fibers 1, 2 so that strength deterioration of the connecting portions of the different kind optical fibers caused by the cracks can be prevented.

Further, in the first embodiment, the protecting layer is formed in the exposed portions of the different kind optical fibers 1, 2 except for the etching processing area before the etching process is taken. Further, the first embodiment is constructed such that an area requiring no etching process is protected by this protecting layer. Thus, in the first embodiment, it is possible to restrain the occurrence of a situation in which the strength of the optical fibers 1, 2 is weakened by excessively etching the area requiring no etching.

In the first embodiment, the length interval of the etching processing area is set to a length interval or more at which the heat treatment is taken. Accordingly, a small crack caused by heating of the heat treatment can be precisely removed by the etching.

Accordingly, in this first embodiment, satisfactory strength can be provided to the connecting portions of the different kind optical fibers 1, 2.

Further, in the first embodiment, the heat treatment for conforming the mode field diameters of the optical fibers 1, 2 is taken although the different kind optical fibers 1, 2 having the different mode field diameters are connected. Accordingly, splice loss of the different kind optical fibers can be reduced and restrained.

Figure 2:
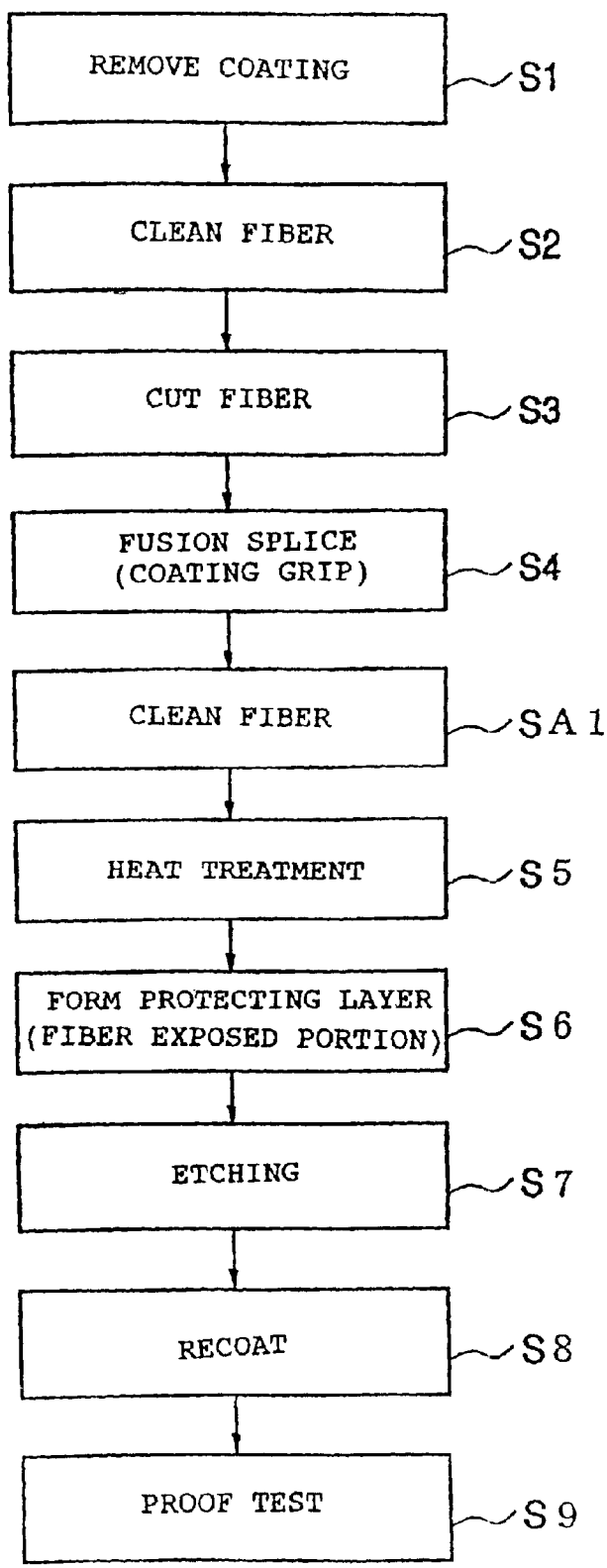
FIG. 2 is a flow chart showing a connecting process of different kind optical fibers in a second embodiment of the present invention.

A second embodiment will next be explained. This second embodiment is characterized in that processing for cleaning a portion (heat treatment object area) of at least a heating treatment object is performed as processing just before the heat treatment is taken. In the second embodiment, as shown in FIG. 2, the portion of the heat treatment object of the optical fiber is cleaned in a step SA1 before the heat treatment process of a step S5.

The construction of the second embodiment except for the above construction is approximately similar to that of the first embodiment. Accordingly, in FIG. 2, processes similar to those in FIG. 1 are designated by the same step numbers as FIG. 1. In the explanation of the second embodiment, overlapping explanations of the same constructional portions as the first embodiment are omitted.

In the second embodiment, connecting portions of the different kind optical fibers 1, 2 are cleaned just before the heat treatment is taken as mentioned above. For example, this cleaning is performed by using a cleaning liquid such as alcohol, acetone, a strong acid (sulfuric acid, hydrochloric acid, nitric acid, etc.) and a weak acid (including strong acid diluted with pure water). For example, this cleaning is also performed by dipping the connecting portions of the optical fibers 1, 2 into the cleaning liquid.

In the second embodiment, effects similar to those in the above first embodiment can be obtained by the above construction.

Further, in accordance with the second embodiment, foreign matters are removed from the surfaces of the connecting portions of the different kind optical fibers 1, 2 by cleaning the connecting portions of the different kind optical fibers 1, 2 just before the heat treatment. Thus, the heat treatment can be taken in a state in which no foreign matters are almost attached to the connecting portions of the different kind optical fibers 1, 2.

Namely, the heat treatment process in the second embodiment (step S5 of FIG. 2) is performed within a low dust space having a clean degree of 1000 or less in class, i.e., under an environment in which the floated foreign matters are very small, and is also performed in a state in which no foreign matters are almost attached to the connecting portions of the different kind optical fibers 1, 2.

Accordingly, in the second embodiment, the amount of the foreign matters burned onto the surfaces of the connecting portions of the different kind optical fibers 1, 2 can be greatly reduced by the above heat treatment. Thus, in the second embodiment, the generation of cracks caused by the burned foreign matters can be more reliably restrained and strength deterioration can be avoided.

The present inventors have confirmed the effects of this second embodiment and the effects of the above first embodiment by an experiment. In this experiment, breaking strength was examined with respect to each of the connecting portions of the different kind optical fibers 1, 2 of four kinds (kind A to kind D) shown in Table 1. The different kind optical fibers 1, 2 of these four kinds were connected by four connecting techniques shown as follows.

TABLE 1

| | Average breaking strength (GPa) | Standard deviation ó (GPa) | Main breaking position |
|---|---|---|---|
| A | 0.96 | 0.46 | heat treatment portion |
| B | 2.39 | 0.37 | heat treatment portion |
| C | 2.81 | 0.38 | heat treatment portion |
| D | 1.76 | 0.42 | except for heat treatment portion |

Figure 9:
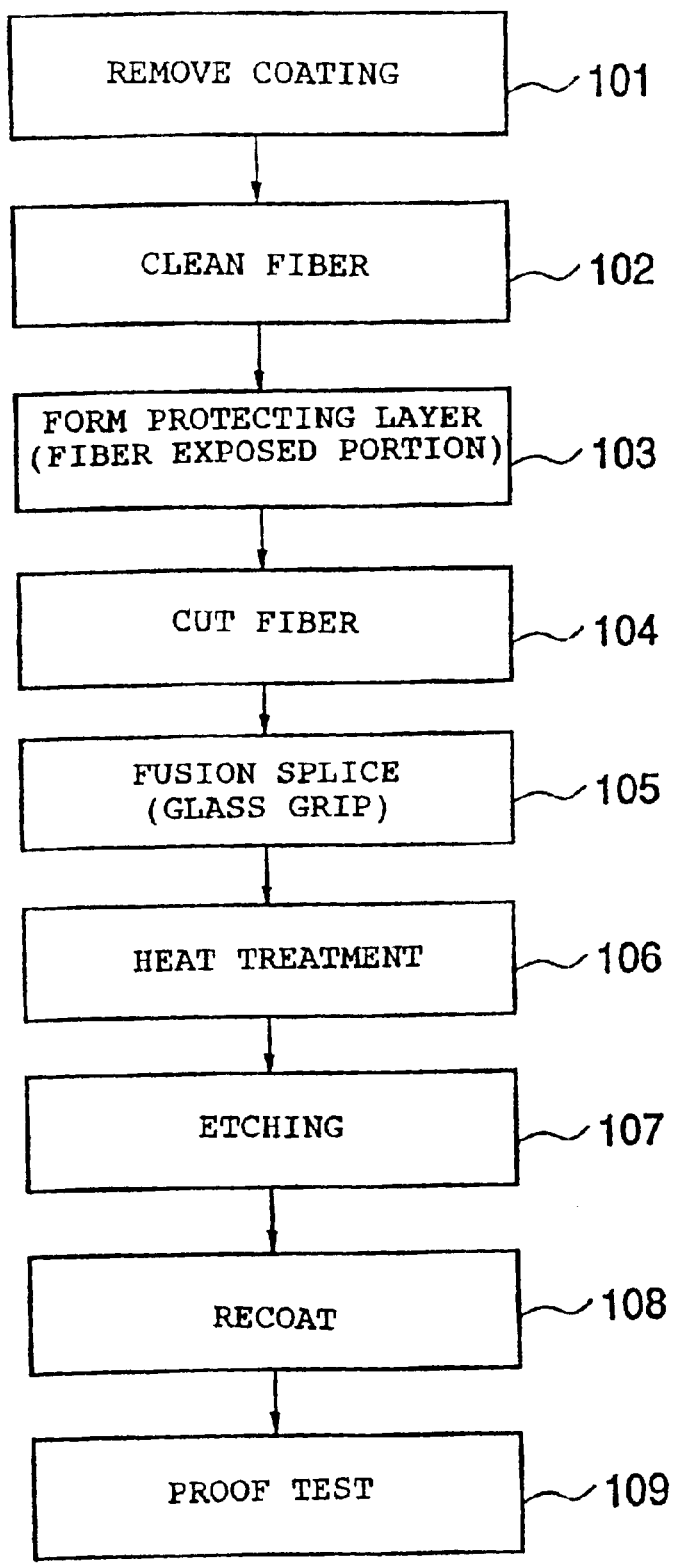
FIG. 9 is a flow chart of the connecting process showing a conventional example of the connecting process of the different kind optical fibers.

In the above kind A, the optical fibers 1, 2 are connected to each other by the conventional connecting technique shown in FIG. 9. In this kind A, the length interval $L_E$ of an etching processing area is set to a length interval ($L_H \leq L_E < L_B$) equal to or greater than the length interval $L_H$ of a heat treatment area and smaller than an interval $L_H$ removing the coating layer 3 therefrom. In the kind B, as shown in FIG. 1, the optical fibers 1, 2 are connected to each other by the connecting technique of the first embodiment. In the kind B, the length interval of the etching processing area is formed similarly to the kind A.

In the kind C, the optical fibers 1, 2 are connected to each other by the connecting technique of the second embodiment as shown in FIG. 2. The length interval of the etching processing area in the kind C is similar to that in the kind A. In the kind D, the optical fibers 1, 2 are also connected to each other by the connecting technique shown in the second embodiment as shown in FIG. 2, but the length interval $L_E$ of the etching processing area is different from that in the kind C. In the kind D, the length interval of the etching processing area is set to a length interval ($L_E \geq L_B$) equal to or greater than the interval $L_B$ removing the coating layer 3 therefrom.

In each of the kinds A to D, an MFD enlarged type single mode optical fiber and a dispersion-compensating optical fiber are connected to each other. In this MFD enlarged type single mode optical fiber, a core is formed by $GeO_2$ dope silica, and a clad is formed by pure silica, and the MFD at a wavelength of 1550 nm is set to 12 μm. In the dispersion-compensating optical fiber, a core is formed by $GeO_2$ high concentration dope silica, and a clad is formed by pure silica, and the MFD at a wavelength of 1550 nm is set to 4.9 μm.

In the above samples of the kinds A to D, ten samples are manufactured every kind. Table 1 shows the calculated experimental results of an average breaking strength of these ten samples and its standard deviation a.

The following contents can be confirmed from this Table 1. Namely, in a sample (kinds B, C, D) in which the different kind optical fibers 1, 2 are connected to each other by the connecting technique shown in each of the first and second embodiments, the strength of a connecting portion is greatly improved in comparison with a sample (kind A) in which the different kind optical fibers 1, 2 are connected to each other by the conventional connecting technique.

Further, in a sample (kinds B, C, D) in which the different kind optical fibers 1, 2 are connected to each other by the connecting technique shown in each of the first and second embodiments, dispersion of the strength can be also restrained in comparison with a sample (kind A) in which the different kind optical fibers 1, 2 are connected to each other by the conventional connecting technique.

Further, as can be seen from the comparison of kinds C and D, it can be confirmed that the strength of the connecting portion can be raised by etching only an area required to remove cracks, and the dispersion of the strength can be restrained.

Thus, the effects of the first embodiment and the second embodiment are also confirmed by the experiment.

Figure 4:
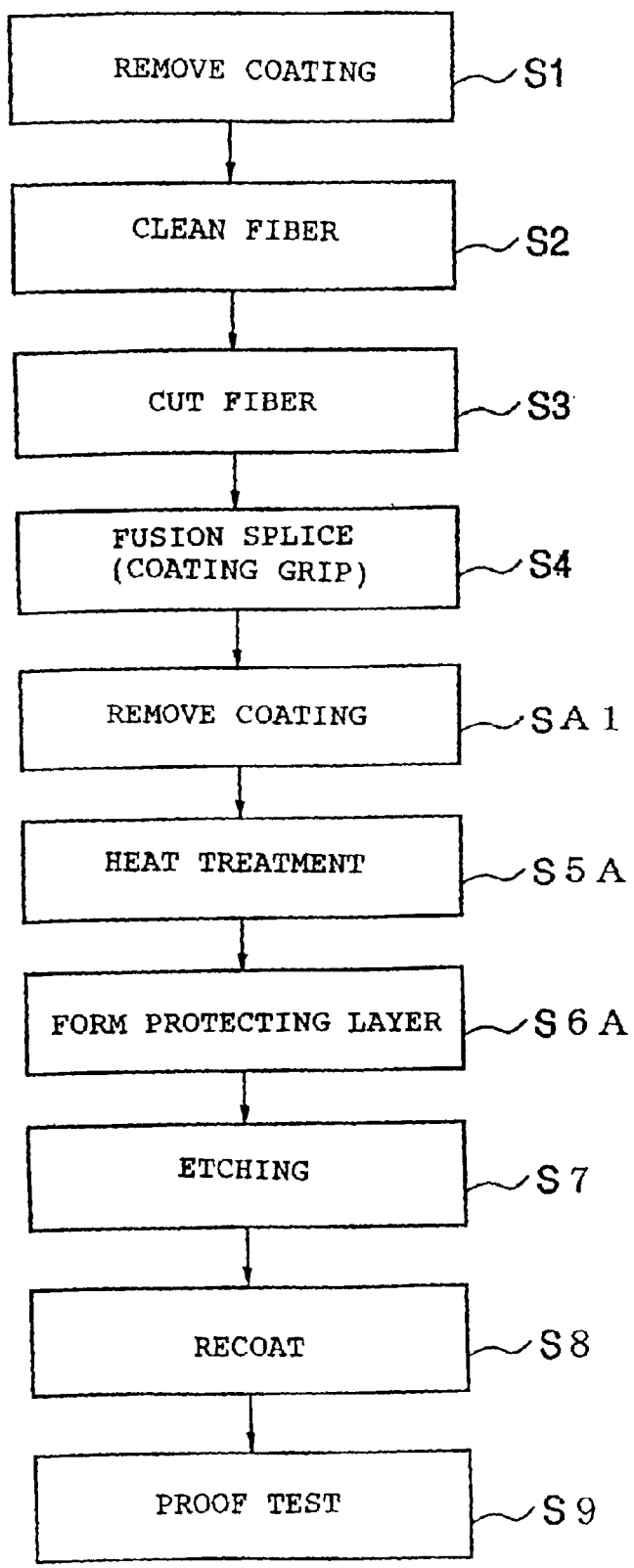
FIG. 4 is a flow chart of a connecting process showing a third embodiment of a connecting method of the different kind optical fibers in the present invention.

A third embodiment of the connecting method of the optical fibers in the present invention will next be explained. In the third embodiment, the connecting method is executed as shown by the flow chart of FIG. 4. In the third embodiment, the different kind optical fibers are connected by processes approximately similar to those in the above second embodiment. In FIG. 4, processes similar to those in FIG. 2 are designated by the same step numbers. In the explanation of the third embodiment, overlapping explanations of the same constructional portions as the above second embodiment are omitted or simplified.

The third embodiment differs from the second embodiment in the following constructions. Namely, one of constructions of the third embodiment different from those of the above second embodiment is that the heat treatment is taken without particularly setting a clean degree in a step S5A of FIG. 4.

Another construction of the third embodiment different from the constructions of the second embodiment is that a protecting layer forming area after the heat treatment is set to an area different from the protecting layer forming area in the above second embodiment. Namely, the third embodiment is constructed such that a root outer circumferential face of an exposed optical fiber is coated with a protecting layer together with a removing end face portion of the coating layer 3 in a protecting layer forming process in a step S6A of FIG. 4.

Figure 5A:
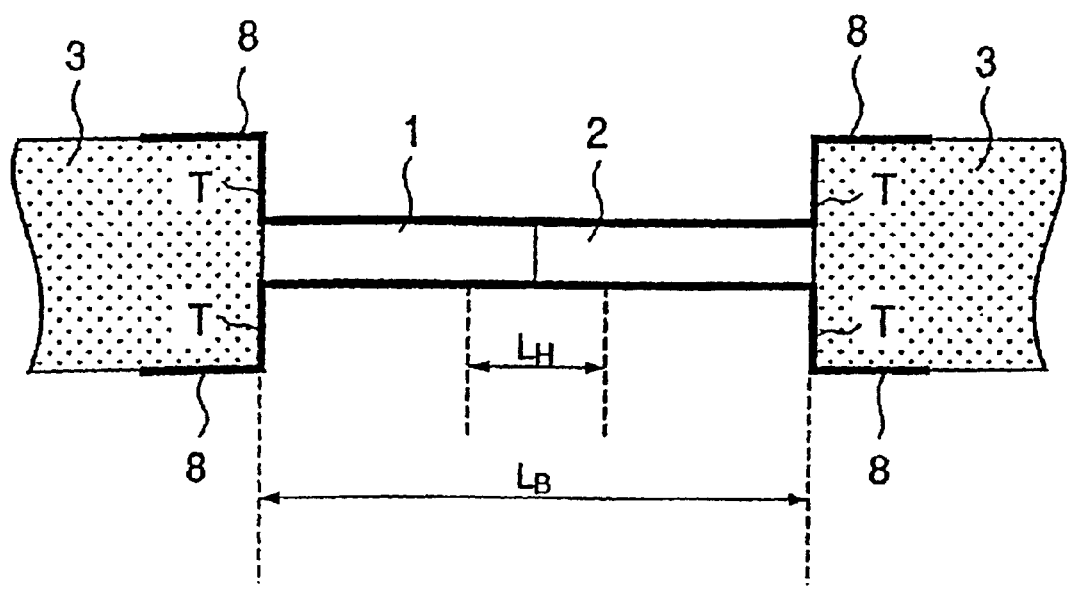
FIG. 5A is a model diagram for explaining a protecting layer forming process in the connecting process of the different kind optical fibers in the third embodiment.

As shown in FIG. 5A, this protecting layer forming process is a process for forming the protecting layer 8 from each of connecting portions of the different kind optical fibers 1, 2 to the upper face of an end portion of the coating layer 3 through a removing end face T of the coating layer 3. Thus, the root outer circumferential face of each of the exposed optical fibers 1, 2 is coated with the protecting layer 8 together with the removing end face T of the coating layer 3. For example, there are varnish (urethane system, ester system, amide system, nylon system, etc.), a resin system adhesive, etc. as a material constituting the protecting layer 8.

Figure 5B:
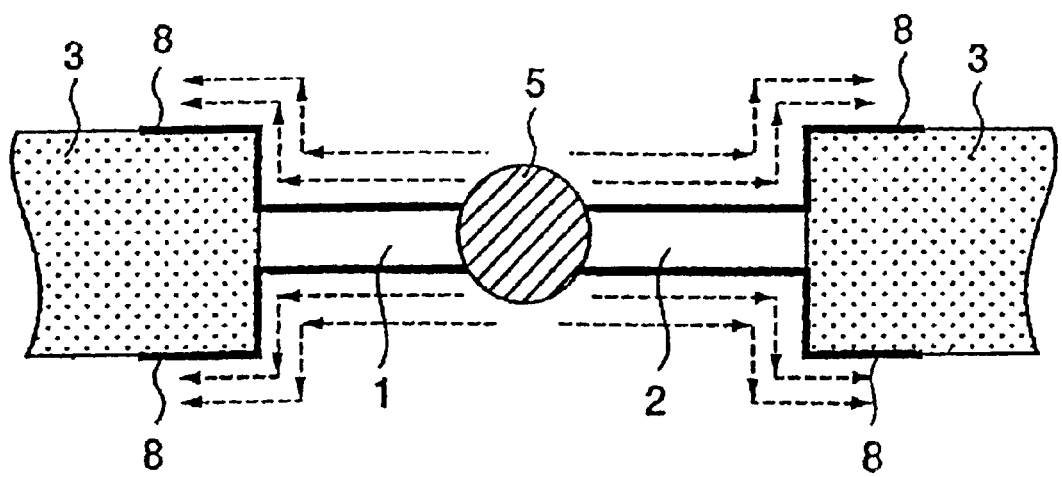
FIG. 5B is a model diagram for explaining an etching process in the connecting process of the different kind optical fibers in the third embodiment.

In the third embodiment, the etching process of a step S7 of FIG. 4 is performed by attaching an etching liquid 5 to a portion in which the heat treatment of at least the different kind optical fibers 1, 2 is taken as shown in FIG. 5B. Thus, the protecting layer 8 in the portion attaching the etching liquid 5 thereto is dissolved so that the optical fibers 1, 2 are exposed to the etching liquid 5 and surface portions of these optical fibers 1, 2 are etched. Cracks formed in the surface portions of the connecting portions of the different kind optical fibers 1, 2 are removed by this etching processing.

In the third embodiment, an etching processing interval $L_E$ includes a heat treatment interval $L_H$, and a non-etching interval is formed between the etching processing interval $L_E$ and the removing end face T of the coating layer 3 on each of both sides of this etching processing interval $L_E$. In other words, the etching processing interval $L_E$ is an interval ($L_H \leq L_E < L_B$) equal to or greater than the heat treatment interval $L_H$ and smaller than an interval (bare fiber interval $L_B$) removing the coating layer 3 therefrom.

Similar to the above first and second embodiments, the third embodiment is also constructed such that coating portions of the optical fibers 1, 2 each coated with the coating layer 3 are gripped and fixed when cutting processing of the optical fibers and fusion splice processing of the different kind optical fibers 1, 2 are performed. Thus, in the third embodiment, the heat treatment is taken in a state in which no protecting layer is formed in each of the connecting portions of the different kind optical fibers 1, 2. Therefore, a large amount of foreign matters due to burning of the protecting layer is not caused at a heat treatment time of the different kind optical fibers 1, 2.

Moreover, in the third embodiment, the connecting portions of the different kind optical fibers 1, 2 are cleaned just before the heat treatment is taken. Accordingly, in the heat treatment process, it is possible to very reduce the foreign matters floated around the connecting portions of the different kind optical fibers 1, 2.

Accordingly, in the third embodiment, it is possible to very reduce and restrain the crack generation in the connecting portions of the different kind optical fibers 1, 2 due to the burning-in of the foreign matters. Therefore, it is possible to improve the strength of the connecting portions of the different kind optical fibers 1, 2.

Further, in the third embodiment, the protecting layer 8 is formed from each of the connecting portions of the different kind optical fibers 1, 2 to an end portion of the coating layer 3 after the heat treatment is taken. Therefore, in the third embodiment, as shown by an arrow of FIG. 5B, the protecting layer 8 prevents an etching gas from entering the clearance between the coating layer 3 and each of the optical fibers 1, 2.

Thus, it is possible to reliably prevent excessive etching of the optical fibers in the boundary area K of an exposed portion and a coating portion of the optical fibers 1, 2 so that strength deterioration in this boundary area K can be avoided.

In the third embodiment, similar to the above first and second embodiments, the length interval of an etching processing area is set to be equal to or greater than a length interval at which the above heat treatment is taken. Accordingly, a small crack caused by the heat treatment can be precisely removed by the etching.

Further, in the third embodiment, similar to the above first and second embodiments, the heat treatment for conforming the mode field diameters of the optical fibers 1, 2 is taken. Accordingly, splice loss of the different kind optical fibers can be reduced and restrained.

Accordingly, it is possible to connect the different kind optical fibers 1, 2 with low splice loss and high strength in the third embodiment.

The present inventors have confirmed the effects of the third embodiment by an experiment. In this experiment, breaking strength is examined with respect to each of samples a to f shown in Table 2. In these samples a to f, the different kind optical fibers 1, 2 are connected and formed by a connecting technique in which the combinations of respective conditions of the existence of cleaning just before the heat treatment, the existence of the protecting layer at the heat treatment time, and the etching width $L_E$ are different from each other.

TABLE 2

| | Processing | | Etching | Breaking strength (GPa) | | |
|---|---|---|---|---|---|---|
| | Cleaning before heating | Formation of protecting layer | condition Etching width $L_E$ | Average | Standard deviation | Main breaking position |
| a | non-existence | before heating | $L_H \leq L_E < L_B$ | 1.2 | 0.43 | K1 |
| b | non-existence | non-existence | $L_H \leq L_E < L_B$ | 1.6 | 0.37 | K1, K3 |
| c | non-existence | before heating | $L_E \leq L_H$ | 1.0 | 0.46 | K1 |
| d | non-existence | after heating | $L_H \leq L_E < L_B$ | 2.10 | 0.40 | K1 |
| e | existence | after heating | $L_H \leq L_E < L_B$ | 2.39 | 0.34 | K1 |
| f | existence | after heating | $L_B \leq L_E$ | 1.46 | 0.17 | K3 |

In each of the samples a to f, an MFD enlarged type single mode optical fiber and a dispersion-compensating optical fiber are connected to each other. In this MFD enlarged type single mode optical fiber, a core is formed by $GeO_2$ dope silica, and a clad is formed by pure silica, and the MFD at a wavelength of 1550 nm is set to 12 μm. In the dispersion-compensating optical fiber, a core is formed by $GeO_2$ high concentration dope silica, and a clad is formed by doping fluorine to pure silica, and the MFD at a wavelength of 1550 nm is set to 4.9 μm. Further, in this experiment, ten fibers are formed in each sample, and the average breaking strength of these ten fibers, its standard deviation and breaking positions are examined.

In Table 2, the result of the breaking experiment with respect to each of the samples a to f is shown together with the existence of the cleaning just before the heat treatment, the existence of formation of the protecting layer and the etching width $L_E$. An average value and a standard deviation of the breaking strength, and a main breaking position are shown in the breaking experiment result. In the column of "Main breaking position" in Table 2, K1 shows breaking in the connecting portions of the different kind optical fibers 1, 2. Further, K3 shows breaking in the boundary area K of the exposed portion and the coating portion of the optical fibers 1, 2.

Figure 7:
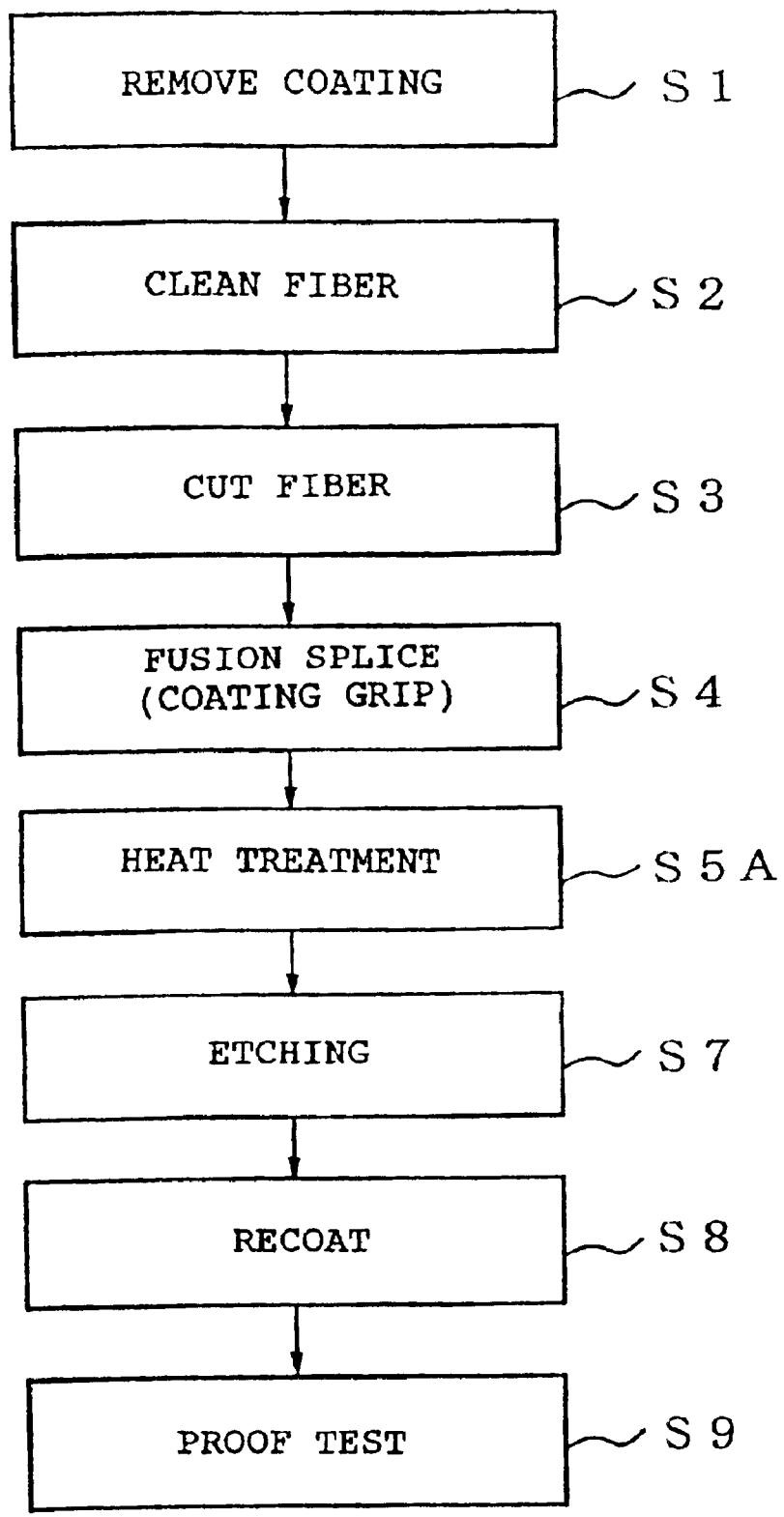
FIG. 7 is a flow chart of the connecting process showing an example in which heat treatment and etching processing are performed without forming the protecting layer in the connecting process of the different kind optical fibers.

The sample b of Table 2 is formed by the flow chart shown in FIG. 7. In the flow chart of FIG. 7, no protecting layer is formed in the exposed portion of the optical fiber before and after the heat treatment in the connecting method of the different kind optical fibers. In FIG. 7, processes similar to those in FIG. 4 are designated by the same step numbers.

As shown in Table 2, breaking strength is improved in a sample (samples d, e, f) in which no protecting layer is formed before the heat treatment and the protecting layer is formed after the heat treatment as in the third embodiment in comparison with a sample (samples a, c) in which the protecting layer is formed before the heat treatment. Thus, it can be seen that it is possible to restrain cracks from being caused by the burning-in of foreign matters in the connecting portions of the different kind optical fibers 1, 2 by forming the protecting layer after the heat treatment so that strength deterioration of the connecting portions of the different kind optical fibers 1, 2 can be prevented.

In particular, as can be seen from the comparison of samples d and e, the generation of cracks due to the burning-in of foreign matters in the connecting portions of the different kind optical fibers 1, 2 is further prevented by cleaning the connecting portions of the different kind optical fibers 1, 2 just before the heat treatment so that the strength deterioration of the connecting portions of the different kind optical fibers 1, 2 can be restrained.

Further, the breaking strength in the samples d, e is improved in comparison with the sample b. Further, in the sample b, there is a sample in which the "main breaking position" becomes K3. Namely, there is a case in which the sample b is broken in the boundary area K of the exposed portion and the coating portion of the optical fibers 1, 2. In contrast to this, in the samples d, e, there is no sample broken in the boundary area K.

As can be seen from this result, in the construction in which the root outer circumferential face of each of the exposed optical fibers 1, 2 is coated with the protecting layer 8 together with the removing end face T of the coating layer 3 in the etching processing, excessive etching can be prevented in the boundary area K of the exposed portion and the coating portion of the optical fibers 1, 2 and the strength deterioration of the optical fibers 1, 2 can be prevented.

In the sample b of Table 2, no protecting layer is formed in the connecting portions of the different kind optical fibers at a heat treatment time of the connecting portions of the different kind optical fibers. Therefore, there is no situation in which a large amount of foreign matters is generated by burning the protecting layer. Accordingly, in the sample b, it is possible to reduce the generation of cracks caused by the burning-in of the foreign matters.

However, in the sample b, no protecting layer is formed after the heat treatment. Accordingly, there is a possibility that breaking is caused in the boundary area K of the exposed portion and the coating portion (a portion coated with the coating layer 3) of the optical fibers 1, 2.

Figure 8:
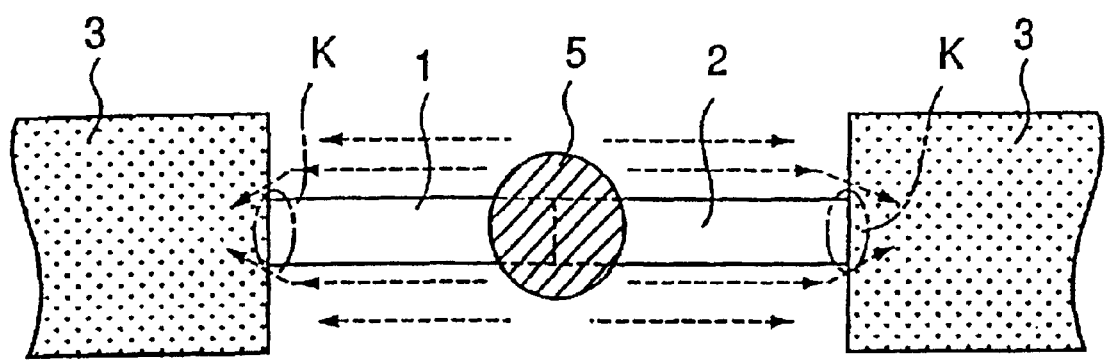
FIG. 8 is a view for explaining cause reasons for excessive etching possibly caused when the etching processing is performed without forming the protecting layer.

The reasons for this were as follows. The etching process in a step S7 of FIG. 7 is a process for attaching an etching liquid 5 to the connecting portions of the different kind optical fibers 1, 2, and etching these connecting portions as shown in FIG. 8. At this etching processing time, an etching gas evaporated from the etching liquid 5 is floated around the connecting portions of the different kind optical fibers 1, 2, and partially enters and stays in a small clearance between the outer circumferential faces of the optical fibers 1, 2 and the coating layer 3 as shown by arrows of FIG. 8. Thus, when the optical fibers 1, 2 are excessively etched by the etching gas entering this clearance, strength deterioration of this optical fiber portion K is caused by this excessive etching.

Further, as can be seen from the comparison of the sample c and the samples d, e, breaking strength in a sample (samples d, e) including the heat treatment interval $L_H$ ($L_E \geq L_H$) within the etching processing interval $L_E$ is strong in comparison with a sample (sample c) in which the etching processing interval $L_B$ is narrower than the heat treatment interval $L_H$ ($L_E < L_H$). In the sample c, the breaking strength is weak and the breaking position is located in the connecting portions of the different kind optical fibers 1, 2. This is because cracks due to the heat treatment cannot be completely removed by the etching, but are left. In contrast to this, in the samples d, e, it can be seen that the cracks of the connecting portions of the different kind optical fibers 1, 2 can be removed by the etching, and strength deterioration can be prevented.

Moreover, as can be seen from the comparison of samples e and f, the strength deterioration can be restrained in the construction in which a non-etching interval is formed between the etching processing interval $L_E$ and the removing end face T of the coating layer 3. When the etching processing interval $L_E$ exceeds the exposed interval $L_B$ of the optical fibers 1, 2 as in the sample f, the optical fibers 1, 2 are excessively etched.

Namely, when the etching processing interval $L_E$ exceeds the exposed interval $L_B$ of the optical fibers 1, 2, the protecting layer 8 is dissolved by the etching liquid 5 even when a portion from the root outer circumferential face of each of the exposed optical fibers 1, 2 to an end portion of the coating layer 3 is coated with the protecting layer 8. Therefore, the etching liquid 5 enters the clearance between the optical fibers 1, 2 and the coating layer 3, and the optical fibers 1, 2 are excessively etched. Thus, strength is deteriorated in the boundary area K of the exposed portion and the coating portion of the optical fibers 1, 2. In contrast to this, it can be seen that the above excessive etching can be prevented in the construction in which a non-etching interval is formed between the etching processing interval $L_E$ and the removing end face T of the coating layer 3 as in the sample e.

This invention is not limited to each of the above embodiments, but various embodiment modes can be adopted. For example, in the above first and second embodiments, the heat treatment is taken within a low dust space having a clean degree of 1000 or less in class. However, for example, processings from the fusion splice processing to the etching processing may be also performed within the above low dust space. Thus, in the construction for taking at least the heat treatment within the above low dust space, no processing performed within the low dust space is limited to only the heat treatment.

Further, in the above first and second embodiments, the protecting layer is not formed before the heat treatment, but is formed after the heat treatment. However, no existence of the formation of the protecting layer is particularly limited in the construction in which at least the heat treatment is taken within the above low dust space. However, the connecting state of further preferable connecting strength is obtained as in the above first and second embodiments by avoiding a heat-treated area and forming the protecting layer after the heat treatment without forming the protecting layer before the heat treatment.

Further, in the above third embodiment, the connecting portions of the optical fibers 1, 2 are cleaned just before the heat treatment. However, for example, the optical fiber cleaning processing as processing just before the heat treatment may be omitted when the heat treatment is taken within the low dust space (e.g., within the space of a clean degree having 1000 or less in class) as in the above first and second embodiments.

Figure 6:
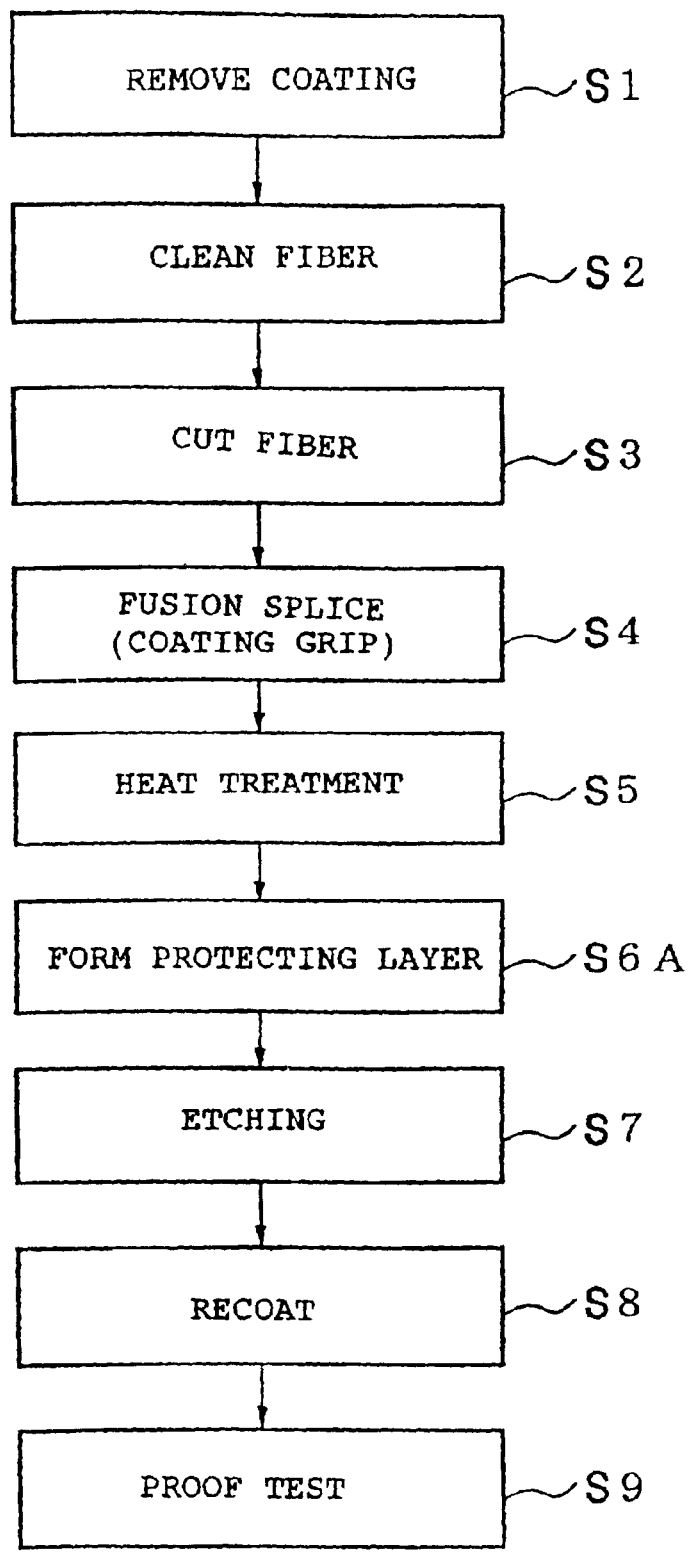
FIG. 6 is a flow chart of a connecting process showing another embodiment of the present invention.

In the embodiment of this construction, the connecting method of the different kind optical fibers is executed in accordance with e.g., the flow chart of FIG. 6. FIG. 6 is the flow chart of an embodiment in which the fiber cleaning process of the step SA1 of FIG. 4 is omitted and the heat treatment of the step S5 is taken within the above low dust space.

INDUSTRIAL APPLICABILITY

As mentioned above, the connecting method of the different kind optical fibers of the present invention is used in e.g., an optical submarine cable, and is suitable for the connection of the different kind optical fibers applied at a dispersion management line forming time, etc. at which the different kind optical fibers with low transmission loss and high strength are desirably connected to each other.

What is claimed is:

1. A method of fusion splicing two optical fibers having different mode field diameters comprising:
   fusion splicing end faces of the optical fibers; and
   heat-treating the fusion spliced portion optical fibers at a temperature sufficient to conform the mode field diameters,
   wherein said heat-treating is performed under a clean degree of 1000 or less in class.

2. The method of claim 1, further comprising cleaning just before the heat-treating.

3. The method of claim 1 further comprising forming a protecting layer on the surface of the optical fibers while avoiding the heat treated area after said heat-treating; and,
   etching a surface of the optical fibers including the heat-treated area of the optical fibers.

4. The method of claim 3, wherein the optical fibers coated with coating layers, and said fusion splicing is performed after the coating layers of the optical fibers are removed, and a length interval of an etching processing area is equal to or greater than a length interval of the heat-treated area and smaller than an interval for removing the coating layers therefrom.

5. A method of fusion splicing two optical fibers having different mode field diameters comprising:
   exposing the optical fibers by removing the coating layers of the optical fibers;
   fusion-splicing the exposed optical fibers;
   heat-treating a fusion-spliced portion of the optical fibers to conform the mode field diameters;
   forming a protective layer on both at least a portion of the exposed optical fibers and end face portions of the coating layer after said heat treating; and
   etching a surface of the optical fibers including the heat-treated area of the optical fibers.

6. The method of claim 5, further comprising cleaning just before the heat-treating.

7. The method of claim 5, wherein an etched area includes the heat treated area, and non-etched areas remain in the exposed areas of the optical fibers.

8. A method of fusion splicing two optical fibers having different mode field diameters comprising:
   exposing the optical fibers by removing coating layers of the optical fibers;
   fusion-splicing exposed optical fibers;
   heat-treating a fusion-spliced portion of the optical fibers to conform the mode field diameters; and forming a protective layer on at least a portion of the exposed optical fibers after said heat-treating;

wherein at least said heat-treating is performed under a clean degree of 1000 or less in class.

9. The method of claim 8, wherein the protective layer is formed while avoiding the heat treated area.

10. The method of claim 8, wherein the protective layer is formed on at least a portion of the exposed optical fibers and end face portions of the coating layer.

11. The method of claim 8, further comprising etching a surface of the optical fibers including the heat-treated area of the optical fibers, wherein a length interval of an etching processing area is equal to or greater than a length interval of the heat-treated area and smaller than an interval for removing the coating layers therefrom.

12. The method of claim 8, further comprising cleaning just before the heat-treating.

* * * * *